United States Patent
Kita et al.

[11] Patent Number: 5,951,401
[45] Date of Patent: Sep. 14, 1999

[54] SLAVE DRIVING FORCE-TRANSMITTING MECHANISM FOR VEHICLE

[75] Inventors: Kanji Kita; Shigeo Kurita; Yasuhiro Kawashima; Tohru Mabuchi, all of Mooka; Takeji Shino, Wako, all of Japan

[73] Assignee: Honda Giken Kogyo Kabushiki Kaisha, Tokyo, Japan

[21] Appl. No.: 08/777,577

[22] Filed: Dec. 31, 1996

[51] Int. Cl.[6] ........................................ F16D 3/16
[52] U.S. Cl. ...................... 464/113; 464/124; 464/905
[58] Field of Search ..................... 464/111, 112, 464/113, 114, 115, 120, 123, 124, 905

[56] References Cited

U.S. PATENT DOCUMENTS

| Re. 30,606 | 5/1981 | Sharp ........................................ 464/115 |
|---|---|---|
| 3,282,342 | 11/1966 | Watt ...................................... 464/113 X |
| 4,068,499 | 1/1978 | Sharp ........................................ 464/115 |
| 4,273,209 | 6/1981 | Orain ................................... 464/115 X |
| 4,279,131 | 7/1981 | Pringle .................................. 464/115 |
| 4,318,282 | 3/1982 | Orain ................................... 464/115 X |
| 4,371,356 | 2/1983 | Dore . | |
| 4,518,370 | 5/1985 | Orain ...................................... 464/113 |
| 4,698,046 | 10/1987 | Poulin ..................................... 464/115 |
| 4,778,026 | 10/1988 | Uchida et al. ...................... 464/111 X |
| 4,829,849 | 5/1989 | Masuda et al. . | |

FOREIGN PATENT DOCUMENTS

| A1-4036280 | 5/1991 | Germany . | |
|---|---|---|---|
| 369930 | 8/1939 | Italy ...................................... 464/124 |
| 54-105634 | 8/1979 | Japan .................................... 464/115 |
| 58-50349 | 3/1983 | Japan . | |
| A-6349526 | 3/1988 | Japan . | |
| A-3224831 | 10/1991 | Japan . | |
| 8119769 | 6/1981 | United Kingdom . | |
| 8204198 | 2/1982 | United Kingdom . | |
| A-2218778 | 11/1989 | United Kingdom . | |

OTHER PUBLICATIONS

Patent Abstract of Japanese Publication No. 61171613, Publication Date: Aug. 2, 1986 (in English).
Patent Abstract of Japanese Publication No. 58142027, Publication Date: Aug. 23, 1983 (in English).

*Primary Examiner*—Eileen Dunn Lillis
*Attorney, Agent, or Firm*—Birch, Stewart, Kolasch & Birch, LLP

[57] ABSTRACT

Tripod joints, each of which includes revolvable rollers to be directly fitted to outer circumferential surfaces of spider shafts, are provided respectively at both ends of an input-side shaft to which slave driving force is transmitted. Accordingly, it is possible to prevent a slave driving system from transmission of unnecessary torque, and obtain a slave driving force-transmitting mechanism which is compact and light in weight, having a structure simplified as compared with those of the conventional technique.

3 Claims, 7 Drawing Sheets

SLAVE DRIVING FORCE-TRANSMITTING MECHANISM FOR VEHICLE

BACKGROUND OF THE INVENTION

1. Field of the Invention

The present invention relates to a slave driving force-transmitting mechanism for a vehicle, for constructing a power-transmitting system disposed on a side of a slave driving shaft of the vehicle provided with a driving mechanism.

2. Description of the Related Art

A system has been known for four-wheeled vehicles, in which one of the front and rear axles is directly connected to an engine, and the driving torque (hereinafter simply referred to as "torque") is transmitted from the one axle (master driving shaft) to the other axle (slave driving shaft) through a viscous fluid joint which acts in response to the relative velocity of rotation (see Japanese Laid-Open Patent Publication No. 58-50349).

The viscous fluid joint has such a characteristic that the torque to be transmitted changes depending on the difference in velocity of rotation between the master and slave driving shafts. If the difference in velocity of rotation between the master and slave driving shafts exceeds a certain limit, there is given a state in which the master and slave driving shafts are operated as if the both are substantially directly connected. Therefore, it is necessary to set such that the master and slave driving shafts have an equivalent strength to resist to the torque. On the other hand, in the case wherein the difference in velocity of rotation between the master and slave driving shafts is extremely small, the torque transmitted from the master driving shaft to the slave driving shaft is substantially equal to zero. Therefore, the load imposed on the slave driving shaft is extremely relieved in this state.

The system described above for transmitting the torque from the master driving shaft to the slave driving shaft by using the viscous fluid joint includes no function to prescribe the upper limit of the transmitted torque. Therefore, the following inconvenience may occur. Namely, large torque is imposed on joint mechanisms which are provided for a driving shaft (drive shaft) and a power-transmitting shaft (propeller shaft) disposed on the side of the slave driving shaft. As a result, vibration occurs due to friction between constitutional components of the joint mechanisms, and the vibration is transmitted to the vehicle's body. Further, an additional inconvenience may occur. Namely, the joint mechanisms suffer seizure due to frictional heat.

Further, the vehicle is sometimes forced to continue running in a state in which front and rear wheels substantially have different effective diameters as a result of installation of a spare tire or installation of a chain to prevent slipping during running on a road during snowy conditions. In such a state, a difference in the velocity of rotation occurs between the front and rear wheels, and unnecessarily large torque is transmitted to the slave driving shaft, although the running state does not primarily require transmission of torque between both the master and slave driving shafts.

Namely, it is sufficient, for the transmission of torque between the master and slave driving shafts during ordinary operation, to consider only a transition state, while the torque is continuously transmitted to the slave driving shaft when the front and rear wheels substantially have different tire diameters as described above. In general, the vibration, which is caused by friction in the joint mechanism used for the power-transmitting system, is occasionally transmitted to the vehicle's body even in the case as described above.

Therefore, the conventional technique adopts a friction-reducing mechanism such as a needle bearing provided at sliding sections of components for constructing the joint mechanism, in order to avoid friction and seizure which would be caused by frictional heat generated in the joint mechanism.

The present invention proposes a technical concept in which the substantial load imposed on the side of a slave driving shaft is relieved to give relief to an entire driving mechanism by regulating the upper limit of torque transmitted from a master driving shaft to a slave driving shaft by using a transmission torque-restricting means (see Japanese Laid-Open Patent Publication No. 63-49526). The present invention proposes a technical concept in which the upper limit of torque transmitted to a slave driving shaft through a transmission torque-restricting means is regulated, and the transmitted torque is decreased in response to the increase in velocity of a vehicle (see Japanese Laid-Open Patent Publication No. 3-224831).

SUMMARY OF THE INVENTION

A general object of the present invention is to provide a slave driving force-transmitting mechanism for a vehicle which includes a driving mechanism having a function to control torque transmitted from a master driving shaft to a slave driving shaft, wherein the transmitting mechanism, which is a member of a power-transmitting system of the slave driving shaft, is simplified and miniaturized to have a light weight by abridging the friction-reducing mechanism used in the conventional technique.

A major object of the present invention is to provide a slave driving force-transmitting mechanism for a vehicle which includes a power-transmitting system provided with a transmission torque control means, wherein a slave driving wheel is prevented from transmission of excessive torque exceeding a designed value by operating the transmission torque control means to make it possible to simplify the transmitting mechanism without forcing each component of a slave driving system to have strength exceeding a designed value.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Figure 1:
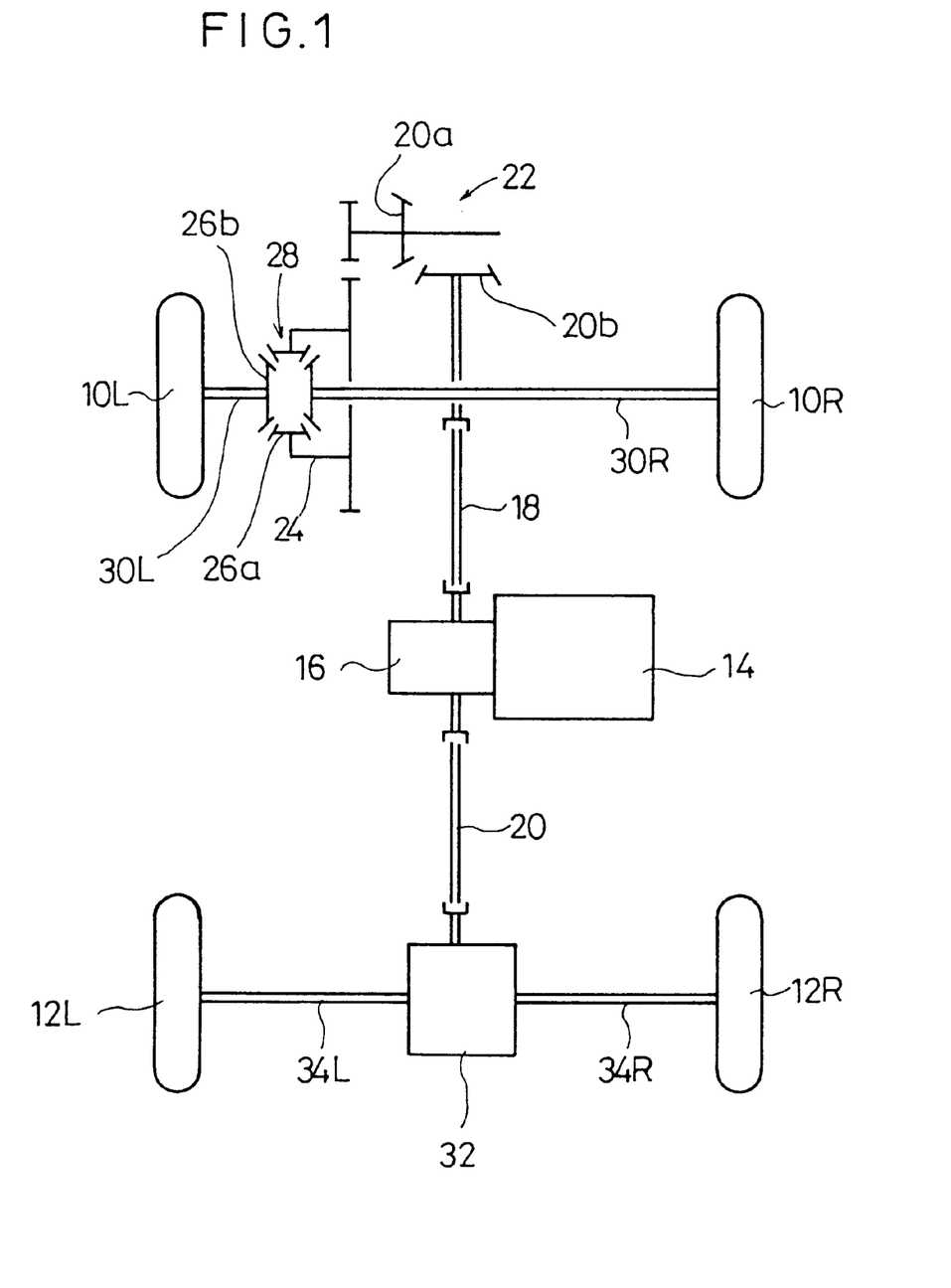
FIG. 1 schematically shows an arrangement of a power-transmitting system of a four-wheeled vehicle comprising a slave driving force-transmitting mechanism incorporated therein according to an embodiment of the present invention.

In FIG. 1, reference numerals 10R, 10L indicate right and left front wheels respectively, 12R, 12L indicate right and left rear wheels respectively, and 14 indicates an engine carried on a four-wheeled vehicle.

As shown in FIG. 1, the engine 14 is carried on a substantially middle portion of a body. A front wheel transmission shaft (propeller shaft) 18 which functions on a master driving side, and a rear wheel transmission shaft (propeller shaft) 20 are connected in front and rear directions respectively to a transmission (gear change mechanism) 16 linked to the engine 14. The front wheel transmission shaft 18 is connected to a right front wheel-driving shaft 30R and a left front wheel-driving shaft 30L through a reduction gear unit 22 comprising a first reduction gear 20a and a second reduction gear 20b, and a differential gear unit 28 comprising a differential gear box 24 as well as a first differential gear 26a and a second differential gear 26b engaged with each other.

On the other hand, the rear wheel transmission shaft 20, which functions on a slave driving side, is connected to a right rear wheel-driving shaft 34R and a left rear wheel-driving shaft 34L respectively through a viscous fluid coupling unit 32 (transmission torque control member) which functions to control the transmission torque.

It is noted that such a front wheel driving mechanism is usually adopted in an automobile. As is well known, the torque transmitted from the engine 14 is equivalently distributed to the right and left front wheels 10R, 10L by the aid of the differential gear unit 28, and the right and left front wheels 10R, 10L are rotated at different velocities of rotation upon cornering of the vehicle.

In FIG. 1, the output (torque) of the engine 14 is distributed to the front wheel transmission shaft 18 and the rear wheel transmission shaft 20 through the transmission 16. The torque transmitted from the transmission 16 is transmitted by the front wheel transmission shaft 18 to the right front wheel-driving shaft 30R and the left front wheel-driving shaft 30L through the reduction gear unit 22 and the differential gear unit 28. On the other hand, the torque transmitted from the transmission 16 is transmitted by the rear wheel transmission shaft 20 to the viscous fluid coupling unit 32 which has the function to control the transmission torque. The driving force is further transmitted from the viscous fluid coupling unit 32 to a right rear wheel-driving shaft 34R and a left rear wheel-driving shaft 34L.

The viscous fluid coupling unit 32 includes a transmission torque control means wherein the upper limit of the torque transmitted from the engine 14 to the right rear wheel-driving shaft 34R and the left rear wheel-driving shaft 34L respectively is regulated to be not more than a designated value. As for the details of the transmission torque control means, reference may be made to Japanese Laid-Open Patent Publication No. 63-49526 proposed by the present assignee. This application formed the basis of a priority application which was filed in the U.S. Patent and Trademark Office and has now issued as U.S. Pat. No. 4,829,849 which is hereby incorporated by reference.

Figure 2:
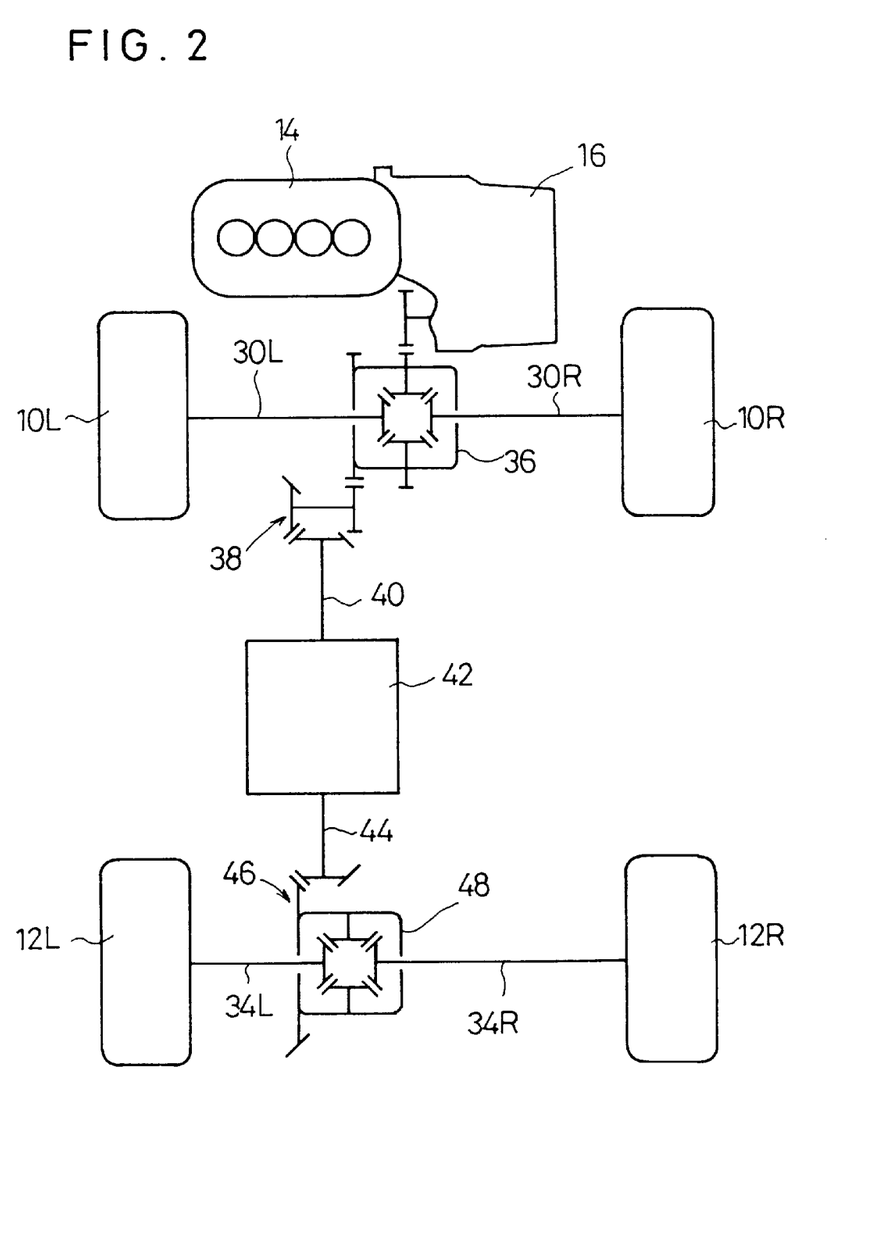
FIG. 2 schematically shows an arrangement of a power-transmitting system of a four-wheeled vehicle comprising a slave driving force-transmitting mechanism incorporated therein according to an embodiment of the present invention.

Next, FIG. 2 shows a system in which an engine 14 is carried on a front portion of a body of a four-wheeled vehicle. In the following description, the same constitutional elements as those shown in FIG. 1 are designated by the same reference numerals, detailed explanation of which is omitted.

In FIG. 2, the output (torque) of the engine 14 is inputted into a first differential gear unit 36 disposed on a front wheel side through a transmission 16. The torque introduced into the first differential gear unit 36 is transmitted to the right and left front wheels 10R, 10L through a right front wheel-driving shaft 30R and a left front wheel-driving shaft 30L which functions on a master driving side.

On the other hand, the torque introduced into the first differential gear unit 36 is supplied to a power-transmitting unit 42 (transmission torque control member) having a function to control the transmission torque through a first bevel gear unit 38 and a first transmission shaft 40. The output of the power-transmitting unit 42 is introduced into a second differential gear unit 48 disposed on a rear wheel side through a second transmission shaft 44 and a second bevel gear unit 46. The output of the second differential gear unit 48 is transmitted to the right and left rear wheels 12R, 12L through a right rear wheel-driving shaft 34R and a left rear wheel-driving shaft 34L which functions on a slave driving side.

Although not shown in FIG. 2, the power-transmitting unit 42 interposed between the first transmission shaft 40 and the second transmission shaft 44 includes a transmission torque-regulating means wherein the upper limit of the torque transmitted from the first transmission shaft 40 to the second transmission shaft 44 is regulated to be not more than a designed value, and a transmission torque-decreasing means wherein the torque transmitted to the second transmission shaft 44 is decreased in response to an increase in the velocity of the vehicle. As for details of the transmission torque-regulating means and the transmission torque-decreasing means, reference may be made to Japanese Laid-Open Patent Publication No. 3-224831 proposed by the present assignee.

Figure 3:
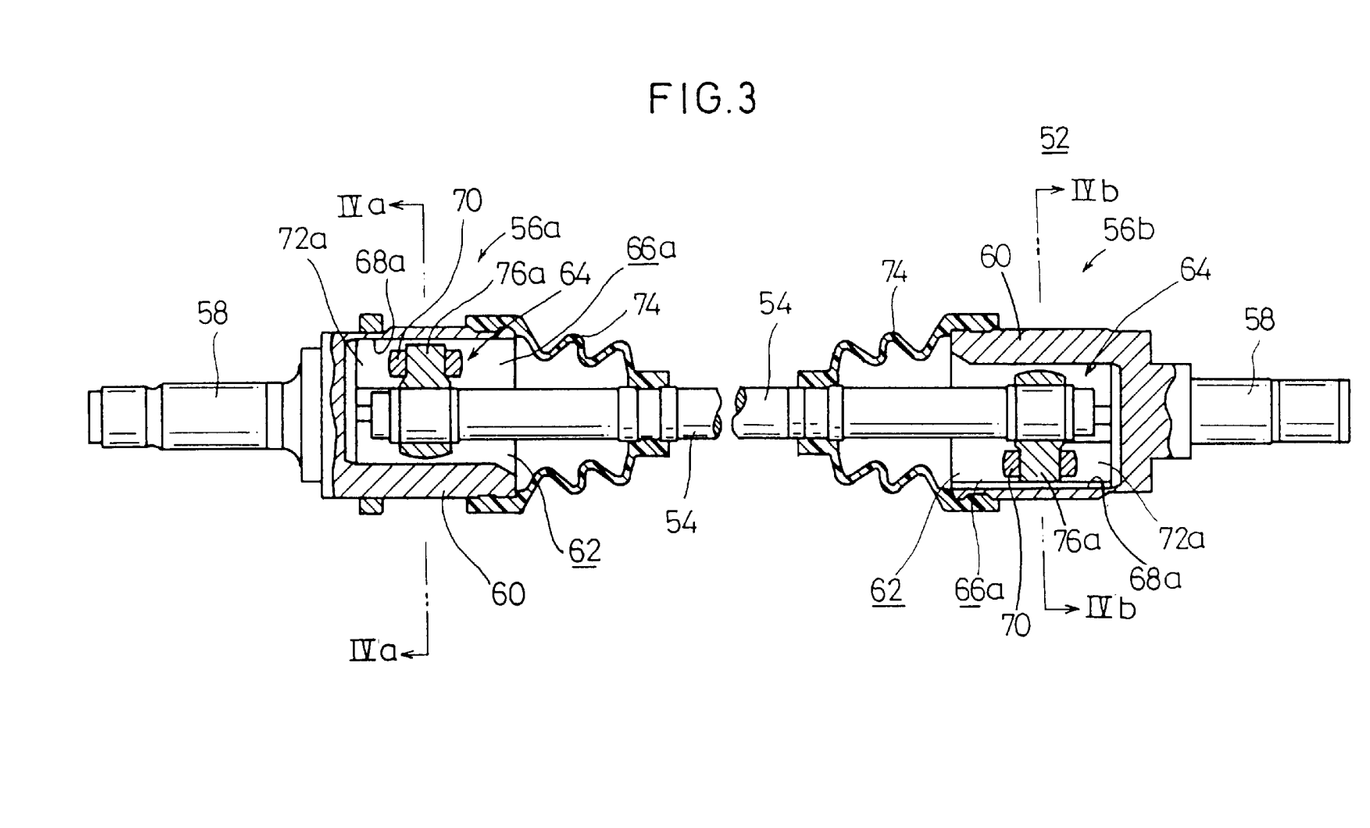
FIG. 3 shows a vertical cross-sectional view with partial omission, illustrating a slave driving force-transmitting mechanism according to an embodiment of the present invention.
Figure 4A:
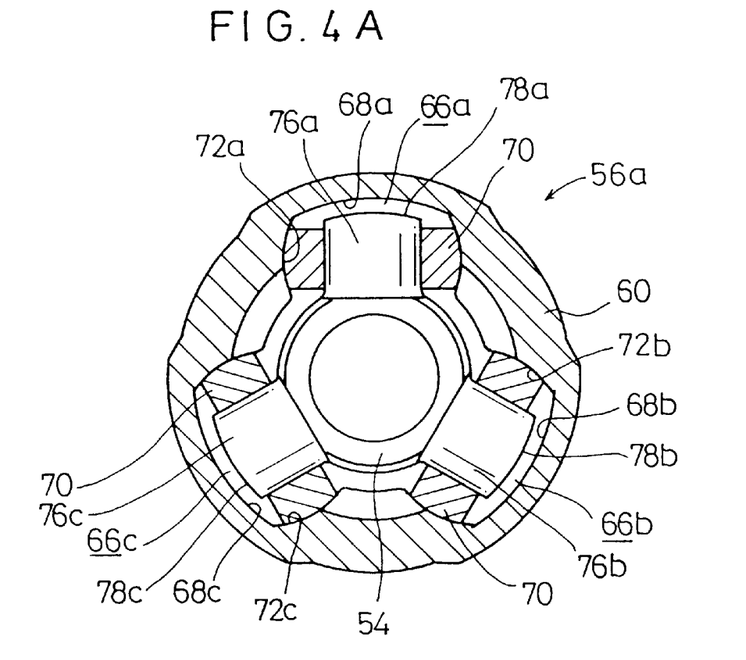
FIG. 4A shows a vertical cross-sectional view taken along a line IVa—IVa shown in FIG. 3
Figure 4B:
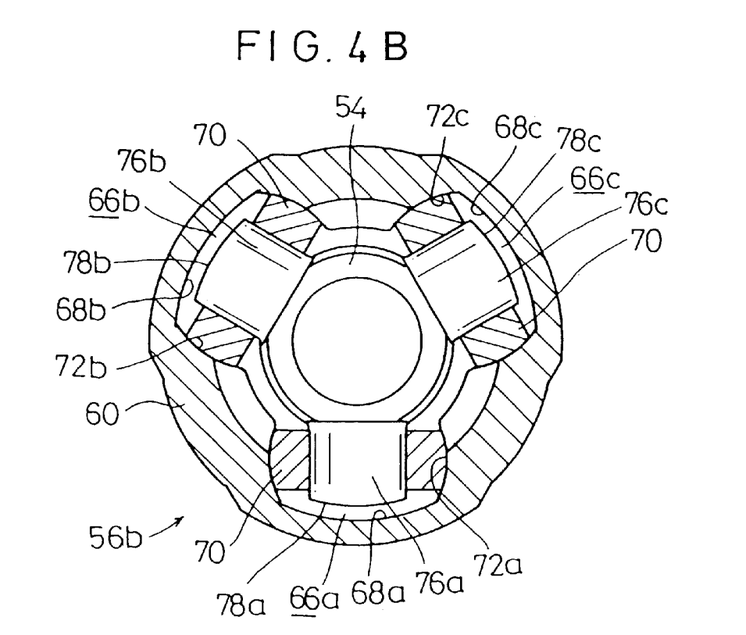
FIG. 4B shows a vertical cross-sectional view taken along a line IVb—IVb shown in FIG. 3.

A specified arrangement of the rear wheel transmission shaft 20 (see FIG. 1), the right and left rear wheel-driving shafts 34R, 34L (see FIGS. 1 and 2), and the first and second transmission shafts 40, 44 (see FIG. 2) is shown in FIGS. 3 and 4, to which a slave driving force-transmitting mechanism 52 according to this embodiment is applied.

The slave driving force-transmitting mechanism 52 comprises an input-side shaft 54 having a diameter and a length in its axial direction in conformity with each of diameters and lengths of the rear wheel transmission shaft 20, the right and left rear wheel-driving shaft 34R, 34L, and the first and second transmission shafts 40, 44. The slave driving force-transmitting mechanism 52 further comprises a first tripod joint 56a and a second tripod joint 56b provided at both ends of the input-side shaft 54 respectively. In this embodiment, the first tripod joint 56a and the second tripod joint 56b are configured to have a substantially identical shape respectively. Accordingly, only one of them will be explained in detail below, while designating the same constitutional elements with the same reference numerals.

As shown in FIG. 3, a first tripod joint 56a is a tripod type universal joint, comprising a cylindrical outer cup 60 having an opening and integrally connected to one end of an output-side shaft 58, and an inner member 64 secured to one end of the input-side shaft 54 and accommodated in a hole 62 of the outer cup 60.

As shown in FIGS. 4a and 4b, three track grooves 66a to 66c, which extend along the axial direction and are spaced apart from each other at an angle of 120 degrees about a central axis, are defined on an inner circumferential surface of the outer cup 60. The track grooves 66a to 66c comprise curved surface sections 68a to 68c formed to have a curved cross-section, and a roller guide grooves 72a to 72c each composed of mutually opposing curved surfaces to slidably contact with a revolvable roller 70 as described later on respectively. The opening of the outer cup 60 is closed by a flexible boot 74 with its both ends interposed by bands.

The inner member 64 has integrally formed three spider shafts 76a to 76c which extend toward the track grooves 66a to 66c and are spaced apart from each other at an angle of 120 degrees about the central axis. Upper surface sections 78a to 78c of the spider shafts 76a to 76c, which are opposed to the curved surface sections 68a to 68c of the track grooves 66a to 66c, are formed to have a curve obtained along a circumference about the central axis. Outer surfaces of the spider shafts 76a to 76c, which are disposed along axial directions of the spider shafts 76a to 76c, are fitted to and surrounded by the ring-shaped revolvable rollers 70 (see FIGS. 4a and 4b).

Moreover, as shown by comparison of the cross-sectional renderings of FIGS. 4a and 4b along with FIG. 3, the spider shafts 76a to 76c of tripod joints 56a and 56b, on each of respective ends of the input-side shaft 54, are positioned in opposite phase, so as to be rotated out of phase with each other.

Outer surfaces of the revolvable rollers 70 are formed to have a curved cross-section corresponding to the roller guide grooves 72a to 72c. The revolvable rollers 70 are slidably displaceable in front and rear directions (right and left directions in FIG. 3) along the roller guide grooves 72a to 72c, and they are slidably rotatable about a center of rotation of the axis of the input-side shaft 54. Moreover, the revolvable rollers 70 are provided displaceably in upper and lower directions (upper and lower directions in FIG. 3) substantially parallel to the axes of the spider shafts 76a to 76c.

Figure 5:
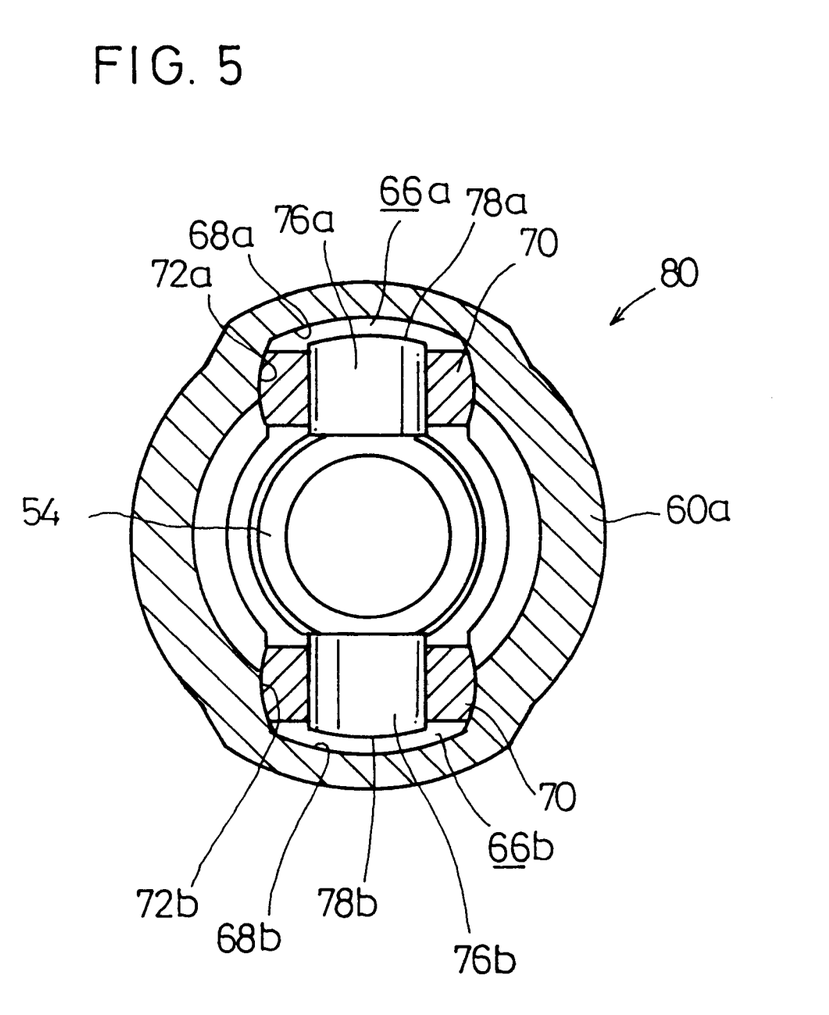
FIG. 5 shows a vertical cross-sectional view of a bipot joint, illustrating a modified embodiment of the slave driving force-transmitting mechanism shown in FIG. 3.

Alternatively, one or both of the first tripod joint 56a and the second tripod joint 56b may be replaced with a bipod type universal joint 80 as shown in FIG. 5, in which two track grooves 66a, 66b are defined on an inner circumferential surface of an outer cup 60a, with two spider shafts 76a, 76b corresponding to the track grooves 66a, 66b.

The inner wall surfaces (curved surface sections 68a to 68c, roller guide grooves 72a to 72c), which construct the track grooves 66a to 66c (66a, 66b) as shown in FIGS. 3 to 5, are not limited to have a curved shape. The inner wall surfaces may be formed to have a straight cross-section in the case of any universal joint of either the tripod type or the bipod type.

Next, the operation, function, and effect of the slave driving force-transmitting mechanism 52 thus constructed will be explained.

The rotational force is given from the input-side shaft 54 to the output-side shaft 58 in a state of forming a predetermined joint angle by using the input-side shaft 54 as an input shaft and using the output-side shaft 58 with the integrally formed outer cup 60 as an output shaft. In this embodiment, the revolvable rollers 70, which are externally fitted to the respective spider shafts 76a to 76c, are slidably displaced in the front and rear directions (right and left directions in FIG. 3) along the roller guide grooves 72a to 72c, and they are slidably rotated about the center of rotation of the axis of the input-side shaft 54. Moreover, the revolvable rollers 70 make contact displaceably in the upper and lower directions (upper and lower directions in FIG. 3) substantially parallel to the axes of the spider shafts 76a to 76c. Thus the rotational force is smoothly transmitted from the input-side shaft 54 to the output-side shaft 58.

In the power-transmitting systems shown in FIGS. 1 and 2, the right and left front wheels 10R, 10L function as the master driving wheels, and the right and left rear wheels 12R, 12L function as the slave driving wheels. In the case of the power-transmitting systems shown in FIGS. 1 and 2, the right front wheel-driving shaft 30R and the left front wheel-driving shaft 30L function as the master driving shafts which transmit the torque to the right and left front wheels 10R, 10L, and the right rear wheel-driving shaft 34R and the left rear wheel-driving shaft 34L function as the slave driving shafts which transmit the torque to the rear wheels 12R, 12L.

The transmission torque control means is operated in the power-transmitting system provided with the transmission torque control means such as the viscous fluid coupling unit 32 and the power-transmitting unit 42 as described above. Accordingly, any torque having a magnitude of not less than a designed value is not transmitted to components other than those for directly generating the torque as a power source. For this reason, any unnecessary torque is not transmitted to all of the power-transmitting systems ranging from the transmission 16 connected to the engine 14 to the slave driving shafts (right and left rear wheels 12R, 12L). Therefore, the transmitted torque is reduced as compared with a system in which the transmission torque control means is not provided.

In the case of the system based on the use of the single prime mover, the range in which the torque is reduced includes the rear wheel transmission shaft 20, the right rear wheel-driving shaft 34R, and the left rear wheel-driving shaft 34L in FIG. 1. In FIG. 2, the range in which the torque is reduced includes the right rear wheel-driving shaft 34R and the left rear wheel-driving shaft 34L, as well as a portion for transmitting the torque to the bevel gears of the first bevel gear unit 38 and the first differential gear unit 36 linked to the first bevel gear unit 38, i.e., portions up to the first and second transmission shafts 40, 44 disposed just downstream from the transmission 16 which directly generates the torque under the driving action of the engine 14.

As described above, in the case of the power transmitting-system provided with the transmission torque control means, unnecessary torque is not transmitted to the slave driving shaft system other than the portion for directly generating the torque. Accordingly, it is possible to design a low structural strength as compared with those based on the conventional technique, and hence it is unnecessary to provide any friction-reducing mechanism such as a needle bearing. As a result, in this embodiment, the slave driving force-transmitting mechanism 52, which is compact and light in weight, having the simplified structure as compared with those based on the conventional technique, can be obtained by adopting the tripod type universal joint comprising the revolvable rollers 70 externally fitted to the respective spider shafts 76a to 76c.

In the case of a power-transmitting system provided with the transmission torque control means, when those disposed on the side of the slave driving shaft are driven by using a subsidiary prime mover (not shown) which is different and independent from a prime mover disposed on the side of the master driving shaft, it is possible to reduce the torque generated at all portions of the power-transmitting system driven by the subsidiary prime mover. It is a matter of course that the slave driving force-transmitting mechanism 52 according to the embodiments of the present invention can be applied to all the portions of the power-transmitting system driven by the subsidiary prime mover.

Figure 6:
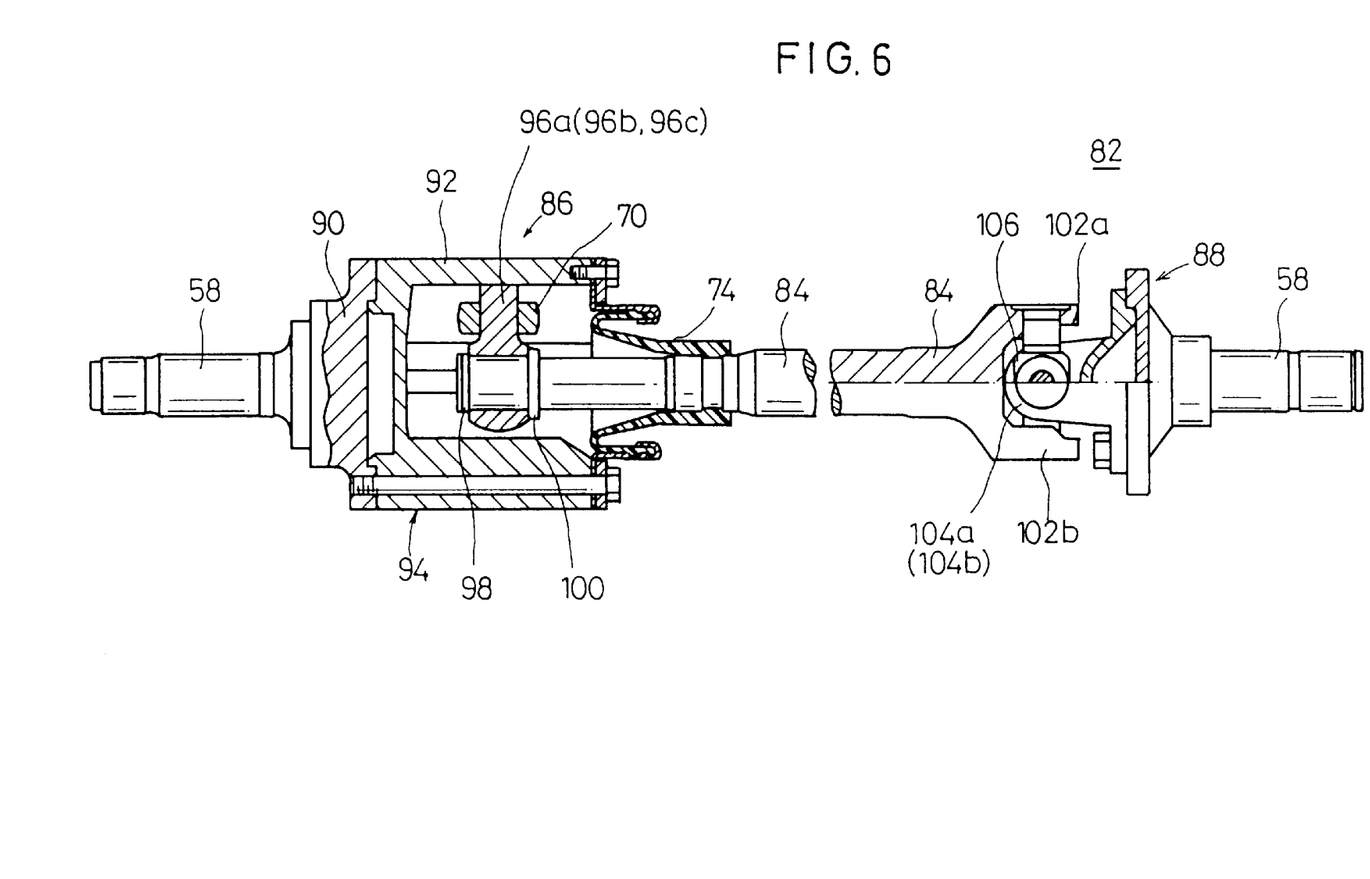
FIG. 6 shows a vertical cross-sectional view with partial omission, illustrating a slave driving force-transmitting mechanism according to another embodiment of the present invention.

Next, a slave driving force-transmitting mechanism 82 according to another embodiment is shown in FIG. 6.

In this slave driving force-transmitting mechanism 82, a tripod joint 86 is provided at one end of an input-side shaft 84, and a cross joint (cross type universal joint) 88 is provided at the other end of the input-side shaft 84. It is a matter of course that the bipod type universal joint 80 may be adopted in place of the tripod joint 86.

The tripod joint 86 includes an outer cup 94 comprising a disk section 90 which is connected to an output-side shaft 58 and a cylindrical section 92 which is integrally connected and fixed to the disk section 90 by the aid of screws. The tri-port joint 86 further includes revolvable rollers 70 which are fitted to outer circumferential surfaces of respective spider shafts 96a to 96c, a circlip 98 for securing the respective spider shafts 96a to 96c to the input-side shaft 84, and an annular expanding section 100.

The outer cup 94 is constructed by fixing the disk section 90 to the cylindrical section 92 by the aid of the screws. However, the outer cup 94 can be altered to the outer cup 60 integrally formed as shown in FIG. 3.

The cross joint 88 comprises a pair of first yoke sections 102a, 102b formed at one end of the input-side shaft 84 and branched to have a substantially U-shaped cross section, a pair of second yoke sections 104a, 104b formed at one end of the output-side shaft 58 and branched to have a substantially U-shaped cross section, and a cross member 106 with two pairs of both ends of protrusions crossing in a substantially cross-shaped configuration, the both ends being rotatably supported by the first yoke sections 102a, 102b and the second yoke sections 104a, 104b respectively. The cross member 106 is rotatably supported so that it is capable of rotation by a predetermined angle about a central axis of rotation of a line segment formed by connecting the first yoke sections 102a, 102b. Moreover, the cross member 106 is rotatably supported so that it is capable of rotation by a predetermined angle about a central axis of rotation of a line segment perpendicular to the foregoing line segment and formed by connecting the second yoke sections 104a, 104b.

Figure 7:
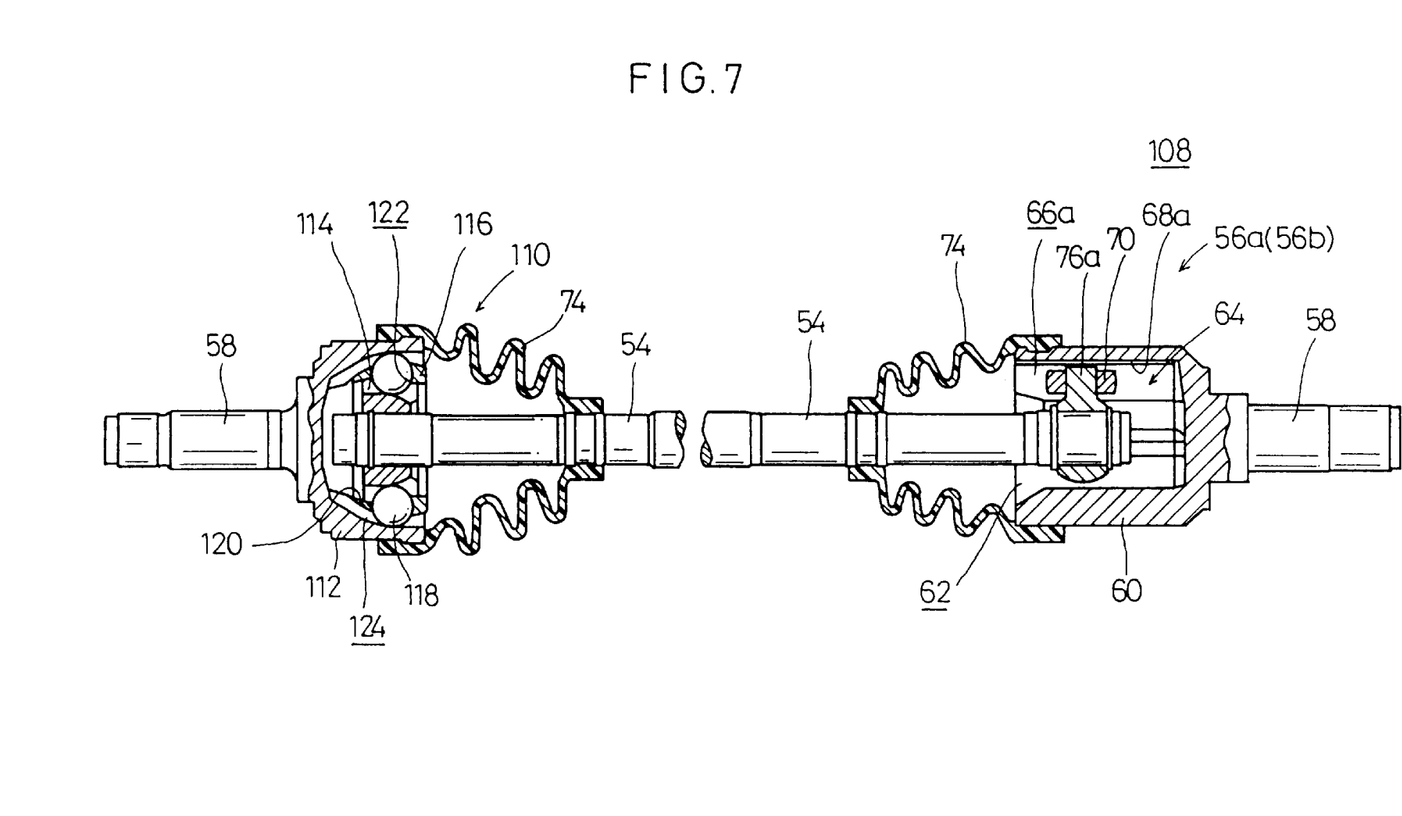
FIG. 7 shows a vertical cross-sectional view with partial omission, illustrating a slave driving force-transmitting mechanism according to still another embodiment of the present invention.

Next, a slave driving force-transmitting mechanism 108 according to still another embodiment is shown in FIG. 7.

This slave driving force-transmitting mechanism 108 is different in structure from the slave driving force-transmitting mechanism 52 shown in FIG. 3 in that a bar field joint (bar field type universal joint) 110 is provided at one end of an input-side shaft 54.

The bar field joint 110 comprises an outer cup 112 and an inner member 114 accommodated in the outer cup 112. The inner member 114 has a cage 116 and a plurality of balls 118.

The outer cup 112 has an inner spherical surface 120. The inner spherical surface 120 is provided with a plurality of ball-rolling grooves 124 spaced apart from each other in a circumferential direction. The cage 116 is provided with an outer spherical surface to fit to the inner spherical surface of the outer cup 112 and a plurality of ball windows 122 spaced apart from each other in a circumferential direction. The balls 118 are held by the respective ball windows 122 in an inscribed state.

The other operation, function, and effect of the slave driving force-transmitting mechanism 108 are substantially the same as those of the slave driving force-transmitting mechanism 52 shown in FIG. 3, detailed explanation of which is omitted.

What is claimed is:

1. A power transmission system for a four wheel vehicle wherein a torque generated from a power source is transmitted directly to a master drive shaft and is also transmitted to a slave drive shaft, comprising:

a transmission torque control means operatively connected to said slave drive shaft for regulating an upper limit of torque transmitted to said slave drive shaft to be not more than a designed value;

an input-side shaft operatively connected to said slave drive shaft and said transmission torque control means; and a joint mechanism comprising two tripod-type slidable universal joints one of said two tripod-type joints be operatively connected to each respective end of said input-side shaft, each of said universal joints comprising;

three spider shafts seated 120 degrees from each other and projecting outwardly from said input-side shaft;

revolvable roller mounted on each of said spider shafts for rotation thereon, said revolvable rollers being direly fitted to outer circumferential surfaces of said spider shafts, respectively; and a cylindrical outer cup having an opening formed therein, and three track grooves formed on an inner circumferential surface of said outer cup and separated 120 degrees from each other, each of said track grooves comprising roller guide grooves composed of mutually opposing surfaces, wherein said revolvable rollers are fitted into said track grooves in slidable contact with said mutually opposing surfaces, wherein the spider shafts disposed on one end of said input-side shaft are positioned so as to rotate out of phase with the spider shafts disposed on the other end of said input-side shaft.

2. The power transmission system according to claim 1, wherein each of said track grooves comprises a curved surface section formed to have a curved cross section, and a roller guide groove composed of mutually opposing curved surfaces to slidably contact with said revolvable rollers.

3. The power transmission system according to claim 2, wherein said revolvable rollers are slidably displaceable along respective roller guide grooves, and said revolvable rollers are displaceable along an axial direction of said spider shaft.

* * * * *